United States Patent [19]

Szechenyi

[11] Patent Number: 4,878,229

[45] Date of Patent: Oct. 31, 1989

[54] FAST FRAME AND PHASE SYNCHRONIZATION APPARATUS

[75] Inventor: Kalman Szechenyi, Spiegelberg, Fed. Rep. of Germany

[73] Assignee: Alcatel N.V., Amsterdam, Netherlands

[21] Appl. No.: 203,672

[22] Filed: Jun. 7, 1988

[30] Foreign Application Priority Data

Jun. 12, 1987 [DE] Fed. Rep. of Germany ....... 3719659

[51] Int. Cl.$^4$ ............................................. H04L 7/08
[52] U.S. Cl. ...................................... 375/14; 375/116
[58] Field of Search ..................... 375/12, 13, 14, 114, 375/116, 118, 119; 328/151, 155

[56] References Cited

U.S. PATENT DOCUMENTS

| | | | |
|---|---|---|---|
| 4,320,517 | 3/1982 | Godard | 375/114 |
| 4,598,413 | 7/1986 | Szechenyi | 375/116 |
| 4,627,080 | 12/1986 | Debus, Jr. | 375/119 |
| 4,672,631 | 6/1987 | Suzuki et al. | 375/14 |

FOREIGN PATENT DOCUMENTS 3227151 2/1984 Fed. Rep. of Germany .

Primary Examiner—Benedict V. Safourek
Attorney, Agent, or Firm—Christie, Parker & Hale

[57] ABSTRACT

A fast adjustment of sampling clock phase may be accomplished by calculating the values of the pre-oscillations and post-oscillations that would have been present at each sampling instant to form a correction value so that they may then be subtracted from the measured sample value and only the influence of the distorted unique word remains. Usable control information for readjusting the phase of the sampling clock may thus be derived after only one frame synchronization word has been detected. In a preferred embodiment, the required pre-oscillation and post-oscillation values are derived from the regenerated character data; rather than correcting the sample values themselves, correction values are derived which are used to correct quantities derived from the sample values. The transmission coefficients of the transmission path used to derive the required pre-oscillation and post-oscillation values from the regenerated characters may be either established a priori or derived from the equalization coefficients of an otherwise conventional adaptive equalizer.

5 Claims, 4 Drawing Sheets

FAST FRAME AND PHASE SYNCHRONIZATION APPARATUS

TECHNICAL FIELD

The present invention relates to receiver apparatus for frame and phase synchronization.

CLAIM FOR PRIORITY

This application is based on and claims priority from an application first filed in Federal Republic of Germany on 06/12/87 under Ser. No. P37 19 659.

BACKGROUND ART

In the frame and phase synchronizing apparatus disclosed in commonly assigned published German patent application DE-OS No. 32 27 151, a received character stream is sampled at a sampling rate set by a sampling clock. These sample values are digitized by means of an analog-to-digital converter; transmission distortions in the original digital character stream remain in the digitized sample values. A digital correlator forms the cross-correlation function from a sequence of digital sample values and a known unique word stored in the receiver which serves as a frame synchronization word. The cross-correlation function attains a maximum value when the unique word appears in the received character stream. From these maxima, the frame clock is derived. Only isolated sample values of the cross-correlation function are obtained by the time-discrete sampling process. However, from the two sample values of the cross-correlation function which respectively precede and follow the maximum sample value, it can be determined whether those two values are symmetrically disposed in time (ie, centered) about the maximum value. Clock phase control information can thereby be derived which is used to adjust the phase of the sampling clock.

In the above referenced apparatus, the phase of the sampling clock has to be adjusted slowly. Since any distortion in the character stream will also be present in the individual samples, the values used to derive the control information will include components which originate from pre-oscillations of character data following the unique word and from post-oscillations of character data preceding the unique word. In the prior art, such components are filtered out by averaging over several frame periods.

Both the frame clock and the character clock are thus derived from the received unique word. During transmission along a transmission path, the unique word is distorted in a particular manner. If this distorted unique word is sampled with a phase-error-containing sampling clock, the phase error can be determined from the sample values. However, as part of the distortion on the transmission path, pre-oscillations and post-oscillations are superimposed on the unique word caused by character data respectively following and preceding the unique word, thereby complicating the evaluation of the latter. In the above-referenced prior art apparatus, such pre-oscillations and post-oscillations are taken into account by averaging over several frames, thereby slowing the clock synchronization process.

DISCLOSURE OF INVENTION

A primary object of the present invention is to provide a fast adjustment of sampling clock phase.

In accordance with a broader aspect of the invention, this may be accomplished by calculating the values of the pre-oscillations and post-oscillations that would have been present at each sampling instant to form a correction value which may then be subtracted from the measured sample value, so that only the influence of the distorted unique word remains. Usable control information for readjusting the phase of the sampling clock may thus be derived after only one unique word has been detected.

In a preferred embodiment, the required pre-oscillation and post-oscillation values are derived from the regenerated character data; rather than correcting the sample values themselves, correction values are derived which are used to correct quantities derived from the sample values. The transmission coefficients of the transmission path used to derive the required pre-oscillation and post-oscillation values from the regenerated characters may be either established a priori or derived from the equalization coefficients of an adaptive equalizer.

BRIEF DESCRIPTION OF DRAWINGS

An embodiment of the invention will now be explained with reference to the accompanying drawings, in which.

BEST MODE FOR CARRYING OUT THE INVENTION

Figure 1:
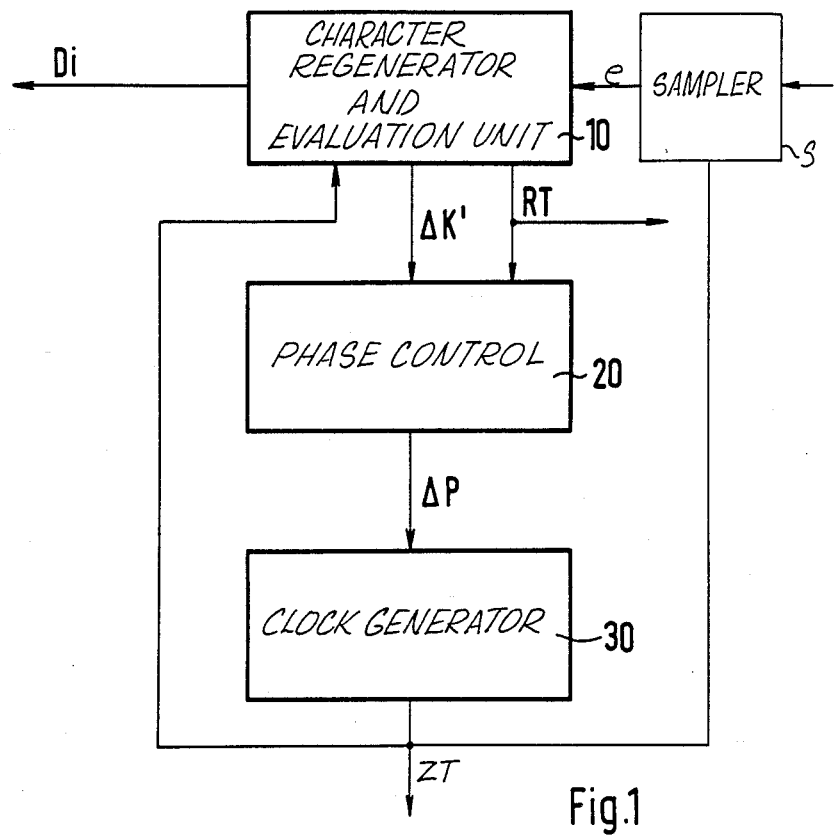
FIG. 1 is an overall block diagram of a facility in accordance with the invention.

As shown in FIG. 1, a preferred embodiment of apparatus in accordance with the present invention can be divided into three blocks. A first block 10 converts a received character stream e from a sampler s into a sequence of binary data Di with the aid of a character sampling clock ZT. Additionally, a frame clock RT and error information $\Delta K'$ are derived in this first block 10. The error information $\Delta K'$ specifies the instantaneous deviation of the phase of the character sampling clock ZT from the actual character clock. From this error information $\Delta K'$, a second block 20 derives adjustment control information $\Delta P$ with the aid of the frame clock RT. The second block 20 performs control functions and is designed to prevent phase jitter or oscillation, for example. A third block 30 generates the character sampling clock ZT, whose phase was corrected by the adjustment control information $\Delta P$.

In the present example, signal processing is performed digitally. The received character stream e consists of a sequence of digitized 8-bit sample values at the repetition rate of the character sampling clock ZT. The error information $\Delta K'$ also consists of 8-bit words but is evaluated only once per frame, i.e., at the repetition rate of the frame clock RT. The adjustment control information $\Delta P$ consists of 4-bit words.

Figure 2:
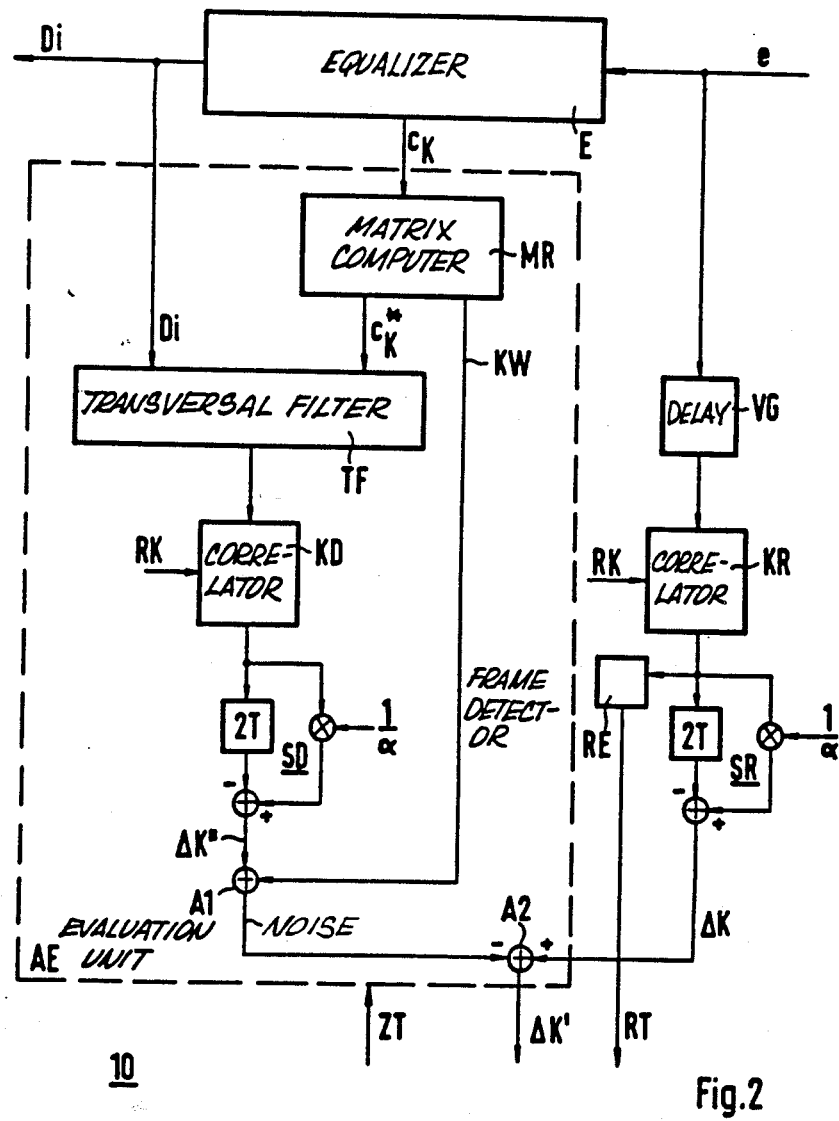
FIGS. 2 and 3 are more detailed block diagrams of the facility of FIG. 1.

FIG. 2 shows the first block 10 of FIG. 1 in greater detail. In an adaptive equalizer E, the binary data Di is derived from the received character stream e.

Figure 4:
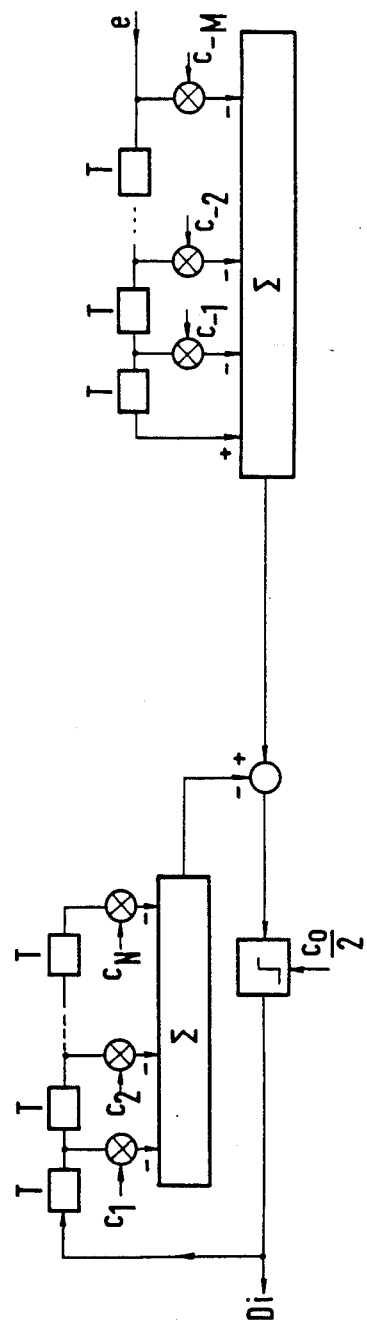
FIG. 4 is a block diagram of a prior art adaptive equalizer.

An example of the construction of this equalizer E is shown in FIG. 4. This construction is familiar to those skilled in the art, so that it need not be described in detail here. Each character of the transmitted character stream is so distorted on the transmission path that a great number of pre-oscillations and post-oscillations are obtained. The spacing of the pre-oscillations and the post-oscillations is equal to the character length, so that pre-oscillations and post-oscillations of different characters will be directly superimposed on each other. In the equalizer E, M pre-oscillations and N post-oscillations of each character are taken into account by being weighted with the coefficients $c_{-1}$ to $c_{-M}$ and $c_1$ to $c_N$, respectively. The subscript of a coefficient gives the distance between the pre-oscillation or post-oscillation to be weighted by this coefficient and the associated character. The character itself is taken into account by the coefficient $c_0$ and by placing the decision threshold at $c_0/2$. It is of secondary importance how many pre-oscillations and post-oscillations are taken into account, and whether the equalization coefficients $c_k$ are preset (ie, known a priori) or adaptively adjusted.

From those equalization coefficients which are necessary to completely equalize the received character stream e, the transmission coefficients of the transmission path can be derived. Since it can be assumed that the actually used equalization coefficients represent a good approximation, a good approximation for the transmission coefficients of the transmission path can be derived from them.

The first block 10 includes an evaluation unit AE. This unit contains a transversal filter TF, which simulates the transmission path. A matrix computer MR in the evaluation unit AE determines the filter coefficients $c_k^*$ of the transversal filter TF from the equalization coefficients $c_k$. The conversion of equalization coefficients $c_k$ into filter coefficients $c_k^*$ is based on the equations of Table 1. The computer used for performing such conversions is of a conventional, well known design.

The output of the transversal filter TF thus provides basically the same signal as that appearing at the input of the equalizer E, but without the deviations caused by errors of the sampling phase. Delays in the equalizer E and in the transversal filter TF, however, result in a delay relative to the received character stream e. To be able to compare the actually received character stream e with the character stream simulated in the transversal filter TF, the received character stream e is suitably delayed in a delay element VG.

The outputs of the delay element VG and the transversal filter TF thus provide two signals which can be compared.

The delay element VG is followed by a correlator KR, which correlates the character stream with the known unique word RK. In a subsequent summing circuit SR, each value is multiplied by a factor of $1/\alpha$, and the value, delayed by two sampling-clock periods T, is subtracted from the product. The result is a correction value $\Delta K$. This correction value $\Delta K$ is composed of a useful component and an interfering component. The useful component is dependent on the phase error of the character sampling clock ZT and is to be used for correcting the latter; the interfering component results from pre-oscillations of the characters following the unique word and from post-oscillations of the characters preceding the unique word.

The transversal filter TF is followed by a similar arrangement of a correlator KD and a summing circuit SD, which forms a correction value $\Delta K''$. Since in this branch the signal is simulated without the sampling-phase error, the useful component in the correction value $\Delta K''$ disappears, leaving only the interfering component. An adder A2 forms the error information $\Delta K'$ by subtracting the correction value $\Delta K''$, which contains only the interfering component, from the correction value $\Delta K$, consisting of a useful component and an interfering component.

Also connected to the output of the correlator KR is the input of a frame detection circuit RE. This frame detection circuit RE generates the frame clock RT, which is needed to further process the binary data Di and to evaluate the error information $\Delta K'$.

The entire first block 10, shown in FIG. 2, operates at the repetition rate of the character sampling clock ZT. Usable error information $\Delta K'$, however, can only be derived from the unique word, i.e, with the frame clock RT.

A further understanding of the derivation of the correction values may be obtained by reference to the above-mentioned published German patent application DE-OS No. 32 27 151; with respect to the factor $1/\alpha$, the reader is referred to published German patent application DE-OS No. 33 33 714 (corresponding to commonly assigned U.S. Pat. No. 4,598,413) which is hereby incorporated by reference.

The correction value $\Delta K''$, which is determined in the evaluation unit AE, contains two further interfering components. The first interfering component results from a nonideal simulation of the transmission path by the transversal filter TF. The second interfering component follows from the fact that the interfering effects of the pre-oscillations and post-oscillations enter into $\Delta K''$ phase-error-free, but into $\Delta K$ with phase errors.

The nonideal simulation of the transmission path is due, on the one hand, to the finite length of the transversal filter TF and, on the other hand, to the fact that the filter coefficients $c_k^*$ contain errors. If, as in the example being described, the filter coefficients $c_k^*$ are not preset but derived from the equalization coefficients $c_k$ of an adaptive equalizer E, both a nonadapted condition of the equalizer and phase errors of the sampling clock will lead to errors in the filter coefficients. All these errors will affect both the data preceding and following the unique word and will also affect the unique word itself. At least the influence of the errors in the filter coefficients on the unique word must be compensated for.

This compensation is effected by calculating the influence of the unique word by itself. Thus, it is necessary to determine that component in the correction value $\Delta K''$ which results from the passage of the unique word through the transversal filter TF, the correlator KD, and the summing circuit SD at the instant relevant for the further evaluation. This is a single, constant correction value KW, which depends only on the unique word and the filter coefficients $c_k^*$. For the very advantageous case where the unique word is an N-bit Barker code, this correction value is $KW = -N(c_1^*/\alpha - c_{-1}^*)$; in the case of an 11-bit Barker code, therefore, $KW = -11(c_1^*/\alpha - c_{-1}^*)$. In this case, the unique word consists of the sequence 11100010010 or a sequence equivalent thereto (inverted in time or polarity). A Barker code has the property that its autocorrelation function is equal to N in case of agreement, and equal to an absolute maximum value of 1 otherwise. In the example of FIG. 2, this correction value KW is calculated in the matrix computer MR and added to the correction value $\Delta K''$ by an adder A1.

The influence of the other interfering quantities is neglected.

The processing of the error information ΔK' into the adjustment control information ΔP, i.e., the internal circuitry of the second block 20, is independent of the way in which this error information ΔK' is derived.

Figure 3:
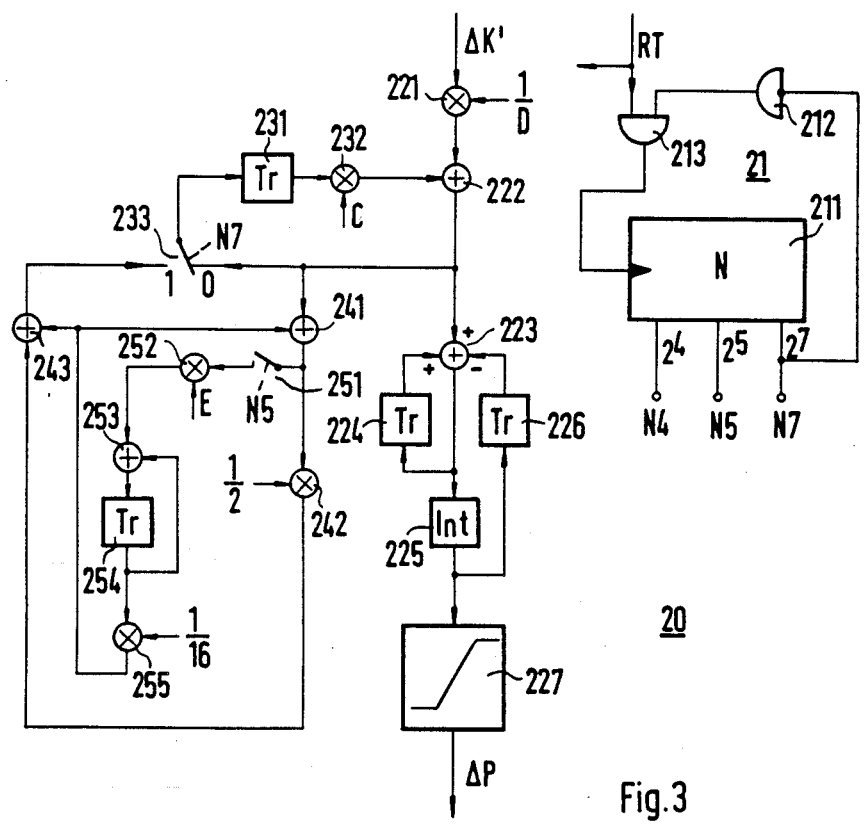

FIG. 3 shows a preferred embodiment of the second block 20 in a detailed block diagram.

On its way to the adjustment control information ΔP, the error information ΔK' passes through a main branch and, as a function of time, through one or more secondary branches. In the main branch, the signal passes first through a multiplier 221, which multiplies it by the reciprocal of a factor D, and then through two adders 222 and 223. It is then rounded to an integer in a rounding unit 225 and limited to a 4-bit value (e.g., $-8$ to $+7$) in a limiter 227. The output value of the limiter 227 is the adjustment control information ΔP. The output of the adder 223 is also temporarily stored in a memory 224 and fed back to a noninverting input of the adder 223 with a delay of one frame period Tr. The output of the rounding unit 225 is temporarily stored in a memory 226 and fed back to an inverting input of the adder 223 with a delay of one frame period Tr.

The signal is tapped between the adder 222 and the adder 223. During the first 128 frame periods, it is fed to a memory 231 via a switch 233, and after one frame period Tr, it is fed through a multiplier 232 back to one input of the adder 222. The multiplier 232 multiplies by a factor C.

After the first 32 frame periods, the signal tapped between the adder 222 and the adder 223 is fed through an adder 241 and a switch 251, which closes after 32 frame periods, to an additional branch which contains a multiplier 252, an adder 253, a memory 254, and an additional multiplier 255 and leads, on the one hand, back to the adder 241 and, on the other hand, via an adder 243 to the switch 233, which advances the signal after the first 128 frame periods. This branch also includes a feedback connection from the output of the memory 254 to one input of the adder 253. The multiplier 252 multiplies by the factor E, and the multiplier 255 by the factor 1/16.

A further branch leads from the output of the adder 241 via a multiplier 242 to a second input of the adder 243. The multiplier 242 multiplies by the factor ½.

The entire second block 20 operates at the repetition rate of the frame clock RT. Thus, once per frame clock period a new digital value appears at any given point of the above-described signal path. To influence both the transient oscillation of this control and the steady state in an advantageous manner, the different branches are switched by the switches 233 and 251, and the factors C, D and E are changed in accordance with Table 2.

The switching between the individual phases is controlled by a counter circuit 21. This circuit includes a seven-stage binary counter 211, whose fourth, fifth, and seventh stages are tapped and provide signals N4, N5, and N7 for controlling the switches and for changing the factors. N4=1 for a count of N≧16, N5=1 for N≧32, and N7=1 for N=128. When the counter is full (N=128), it is stopped by applying the signal N7 through an inverter 212 to one input of an AND gate 213, whose other input is presented with the frame clock RT and whose output is coupled to the clock input of the counter 211. It must, of course, be ensured that the counter is reset in case of loss of synchronism.

The third block 30 of FIG. 1 corresponds to the units 7, 8 and 9 in FIG. 2 of the previously mentioned DE-OS 32 27 151 and may be constructed as shown therein.

The first block 10 may also be constructed differently from the example described with reference to FIG. 2. The function of the transversal filter TF, in particular, can be performed by a computer which also performs the function of the matrix computer MR.

Furthermore, the functions of the two branches can be combined, thus eliminating the need for one of the correlators KR, KD and the associated summing circuit SR, SD. Thus the function of the adder A2 is moved ahead in the signal path. The only operation to be performed at the output is the addition of the correction value KW.

If the data Di associated with the unique word is set to "zero" at the input of the transversal filter TF or at the input of a computer performing the function of the transversal filter, which can be done with the aid of the frame clock, the correction value KW=0; its continuous calculation and its addition in the adder A1 can be dispensed with.

The operation of the correlators and the summing circuits can be described by algorithms. Their functions can therefore be performed by a computer. This applies even to the adaptive equalizer E.

According to the transmission speed of the received character stream e and according to the computers available, variation is possible between the use of computers and the individual realization of the various functions. In that case, it must be taken into account that individual functions have to be performed at the frame clock rate RT, and others at the character sampling clock rate ZT.

The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

TABLE 1

$$C_- = \begin{pmatrix} c_{-1} \\ c_{-2} \\ \vdots \\ c_{-M} \end{pmatrix}; C_+ = \begin{pmatrix} c_0 \\ c_1 \\ \vdots \\ c_N \end{pmatrix}; C_-^* = \begin{pmatrix} c_{-1}^* \\ c_{-2}^* \\ \vdots \\ c_{-M}^* \end{pmatrix}; C_+^* = \begin{pmatrix} c_0^* \\ c_1^* \\ \vdots \\ c_N^* \end{pmatrix}$$

$$K = - \begin{bmatrix} 1 & 0 & \cdots & 0 \\ c_{-1} & 1 & \cdots & 0 \\ c_{-2} & c_{-1} & \cdots & 0 \\ \vdots & \vdots & & \vdots \\ c_{-M+1} & c_{-M+2} & \cdots & 1 \end{bmatrix}$$

$$B = \begin{bmatrix} c_0^* & c_1^* & \cdots & c_{M-1}^* \\ 0 & c_0^* & \cdots & c_{M-2}^* \\ 0 & 0 & \cdots & c_{M-3}^* \\ \vdots & \vdots & & \vdots \\ 0 & 0 & \cdots & c_0^* \end{bmatrix}$$

TABLE 1-continued $$L = \begin{bmatrix} c_0 & c_{-1} & \cdots & c_{-M} & 0 & 0 & \cdots & 0 \\ 0 & c_0 & \cdots & c_{-M+1} & c_{-M} & 0 & \cdots & 0 \\ \cdot & \cdot & & \cdot & \cdot & \cdot & & \cdot \\ \cdot & \cdot & & \cdot & \cdot & \cdot & & \cdot \\ \cdot & \cdot & & \cdot & \cdot & \cdot & & \cdot \\ 0 & 0 & \cdots & 0 & 0 & 0 & \cdots & c_0 \end{bmatrix}$$

$$C_+^* = L^{-1} \cdot C_+; \quad C_-^* = K^{-1} \cdot B \cdot C_-$$

TABLE 2

| N | 0...15 | 16...31 | 32...127 | 128... |
|---|--------|---------|----------|--------|
| C | ¾ | ¾ | ⅞ | 1 |
| D | 1/(¼ + ⅛) | 8 | 16 | 16 |
| E | — | — | 1 | 1/32 |

What is claimed is:

1. Synchronization apparatus responsive to a digital stream of character data which is received over a transmission path and which also includes a unique synchronization word, said apparatus comprising:
   a sampling clock having an adjustable phase;
   digital sampling means for sampling the received digital stream at the repetition rate of the sampling clock to form a series of digital sample values;
   regeneration means for regenerating the character data in response to the digital sample values output by the digital sampling means;
   an evaluation unit responsive to the regenerated character data and to transmission path transmission coefficients for determining correction values corresponding to character data pre-oscillation and post-oscillation effects on uncorrected synchronization data derived from the received digital sample values representing the unique word; and
   phase synchronization means responsive to said correction values and to said uncorrected synchronization data for correcting said uncorrected synchronization data and using the thus-corrected synchronization data to adjust the phase of said sampling clock.

2. The apparatus of claim 1, wherein
   said apparatus further comprises a digital correlator for forming a cross-correlation function from the digital sample values and a stored representation of the unique word, and
   said uncorrected synchronization data are output by said digital correlator and represent isolated values of the cross-correlation function in the vicinity of a maximum value.

3. The apparatus of claim 2, further comprising
   a frame detection circuit for determining a frame clock from regularly recurring maxima of the cross-correlation function.

4. The apparatus of claim 1, wherein
   said regeneration means further comprises an adaptive equalizer for adaptively determining equalization coefficients from the series of digital sample values and using said equalization coefficients for equalizing the received stream of data, and
   said transmission path transmission coefficients are derived from said equalization coefficients.

5. The apparatus of claim 1, wherein
   said transmission path transmission coefficients are predetermined coefficients independent of the received stream of digital character data.

* * * * *